350-361
7/12/83 OR 4,392,711
SR

United States Patent [19]

Moraw et al.

[11] 4,392,711

[45] Jul. 12, 1983

[54] PROCESS AND APPARATUS FOR RENDERING VISIBLE CHARGE IMAGES

[75] Inventors: Roland Moraw; Günther Schädlich, both of Wiesbaden, Fed. Rep. of Germany

[73] Assignee: Hoechst Aktiengesellschaft, Frankfurt am Main, Fed. Rep. of Germany

[21] Appl. No.: 245,720

[22] Filed: Mar. 20, 1981

[30] Foreign Application Priority Data

Mar. 28, 1980 [DE] Fed. Rep. of Germany ....... 3012253

[51] Int. Cl.³ ................ G02F 1/29

[52] U.S. Cl. ................ 350/361

[58] Field of Search ............... 350/361, 355, 362, 3.63

[56] References Cited

U.S. PATENT DOCUMENTS

| | | | |
|---|---|---|---|
| 2,896,507 | 7/1959 | Mast et al. | 350/361 |
| 3,001,447 | 9/1961 | Ploke | 350/361 |
| 3,281,856 | 10/1966 | Anderson | 346/151 |
| 3,397,313 | 8/1968 | Mast | 350/361 |
| 3,560,205 | 2/1971 | Urbach | 350/3.63 |

FOREIGN PATENT DOCUMENTS

| | | |
|---|---|---|
| 2554205 | 7/1976 | Fed. Rep. of Germany . |
| 1122001 | 7/1965 | United Kingdom . |

OTHER PUBLICATIONS

E. Sponable, "Eidophor System of Theater Television", *Journal of the SMPTE*, vol. 60 (Apr. 1953), pp. 337-343.

*Primary Examiner*—William L. Sikes
*Assistant Examiner*—Léon Scott, Jr.
*Attorney, Agent, or Firm*—Schwartz, Jeffery, Schwaab, Mack, Blumenthal & Koch

[57] ABSTRACT

A process and apparatus for rendering visible an electrostatic charge image. The visible image is formed on the surface of a liquid by positioning a charge image adjacent the liquid at distances of about 10 to 1,000 μm from the surface of the liquid without contacting the liquid.

11 Claims, 5 Drawing Figures

PROCESS AND APPARATUS FOR RENDERING VISIBLE CHARGE IMAGES

BACKGROUND OF THE INVENTION

1. Field of the Invention

The invention relates to a process for rendering visible an electrostatic charge image, by deforming the surface of a liquid being present on a support into a reversible, optically readable relief image, and to an apparatus which is suitable for carrying out the process.

2. Description of the Prior Art

It is known, as illustrated, for example in U.S. Pat. No. 3,560,205 to produce a charge image directly on a thermoplastic layer by an image-wise electrostatic charging or, by utilizing an additional photoconductive layer, by electrostatic charging and exposure. When heated, the surface of the thermoplastic layer is deformed into a relief image which is rendered optically visible. In such processes, the heating step is a very critical process step since the optimum temperature range of such a layer is very small. The stability of the relief image depends on the ambient temperature. The relief image can be erased thermically. It has been found, however, that the number of recording cycles which can be performed with photothermoplastics is limited.

It is also known to use recording materials with elastomeric layers, such as shown in German Offenlegungsschrift DE-OS 25 54 205 where the heating step is not required to render charge images visible. A photoconductive layer and an elastomer layer are present on a conductive support. The recording material is first uniformly charged electrostatically or provided with a flexible conductive layer to which a potential is applied. As long as image-wise distributed potential differences are maintained by exposure, the elastomer layer may be reversibly deformed into a relief image. A disadvantage of this process is the fact that the durability of the images is relatively short and does not sufficiently come up to practical requirements. Further, the multi-layer structure of the recording material is expensive.

Further, the Eidophor method is known for achieving a temporary, reversible deformation of a dielectric liquid (e.g., E. I. Sponable, JSMPTE 60, 1953, No. 4, 337). In this process a vacuum tube is utilized wherein an oil film on a conductive support is image-wise sprayed with charges by which surface deformations are produced. A disadvantage aspect of this procedure is that, due to a charge flow-off through the oil film, the relief image is of very short durability. As a consequence, continuous charge images are produced only on the oil film.

SUMMARY OF THE INVENTION

It is therefore an object of the present invention to overcome the above-noted disadvantages of the prior art by providing a process for rendering visible electrostatic charge images in the form of relief images, which can be easily performed with good image stability. The process uses a layer possessing good anti-fatigue properties and a satisfactory charging sensitivity.

In accordance with the invention, the process may be characterized in that—during the period in which the charge is made visible—the electrostatic charge image from which the relief image is produced is arranged at a distance of about 10 μm to about 1000 μm, preferably of about 50 to 150 μm from the surface of the liquid, without mutual contact being created. In this manner, the electrostatic charge image is preferably arranged below the liquid layer, on the rearside of its dielectric support.

Thus, an optimum transformation of the charge image into a relief image is made possible, and the latter can be maintained as long as required, if only the charge image is maintained. The relief image can easily and reversibly be erased by removing or neutralizing the charge image, and the layer can be used for the display of another relief image without showing any signs of fatigue.

The recording of X-ray patterns for medical purposes in an ionization chamber represents a convincing example of this kind of display. An ionization chamber is a plate capacitor which is filled with an X-ray absorbing gas, such as, e.g., xenon. On a dielectric layer above one of the electrode plates, a charge image is produced which is proportional to the X-ray intensity. In order to make possible the evaluation of this charge image, it has to be transformed into an optical image; this should desirably be done without opening the ionization chamber. The relief image must be erasible, i.e., reversible, to allow subsequent records. Especially in the fields of medical application, it is essential that a charge image which once has been produced with a minimum X-ray dose remains stable for a time sufficiently long to make possible its evaluation. Without being confined to this field of application, one can therefore conclude that there is a real demand for electro-optical image converters, by means of which a charge pattern of a high charging sensitivity can be optically displayed for a certain predetermined time.

Liquids whose surfaces can be deformed by charge images are, e.g., silicone oil or fluid polyalpha-methyl styrene. They are preferentially used for displaying reversible relief images. Being dielectric liquids, they are good insulators having resistivities of between $10^{12}$ and $10^{16}$ ohm·cm and relatively high polarizibilities of about $10^{-23}$ cm$^3$. Their chemical composition seems to be of importance only as far as their physical material properties are concerned, for similar results are obtained when fluid resins, such as, e.g., cumaron indene resin or chlorinated diphenyl resin, are employed. It has been shown that aliphatic fluid hydrocarbons, for example, may also be used for displaying relief images as a function of the charging sensitivity. Even water may be used as the liquid layer, for on water surfaces, too, deformations can be produced and be made visible by external charge images, in accordance with the present invention.

The viscosities of the individual liquids mentioned above influence the time required for the formation of relief images. At viscosities of 4,000 mPa·s, or 36,000 mPa·s, the formation periods or, respectively, the smoothing periods of the relief images amount to some 10 seconds, whereas at viscosities of about 100 mPa·s, the formation of relief images takes only a few seconds.

In accordance with the invention, liquids are suitable whose resistivities are in a range of between $10^6$ and $10^{16}$ ohm·cm and higher. Preference is given to liquids having specific resistivities of between about $10^{10}$ and $10^{16}$ ohm·cm and polarizabilities of between about $5 \cdot 10^{-24}$ and $20 \cdot 10^{-24}$ cm$^3$.

In general, the liquids have thicknesses of about 10 μm to 100 μm. Liquid layers having thicknesses of about 20 μm to 50 μm are preferably employed.

Both, metallic and dielectric supports, may be used. However, when metallic supports are used, the charge image must be located above the liquid layer, so that in general, dielectric supports are used. These are the same as conventionally used for corresponding purposes. Rigid glass plates or flexible films may, e.g., be used, whereby preference is given to transparent polyester films. The thicknesses of the supports are of importance inasmuch as the distance between the charge image and the liquid layer surface should not become too great. Therefore, preference is given to supports of thicknesses between 30 and 70 μm, but thicker supports may also be employed.

The electrostatic charge images causing the deformation of the liquid surface can be produced in different ways. They may, e.g., be formed by electrostatic charging and photoconduction, or by charging a dielectric support in image-wise configuration, or by means of electrically controllable electrodes.

The charge images, which are to be made visible, may also be produced on a separate dielectric carrier, e.g., by a corona discharge through masks, by recording electrodes, by electron beams, by X-ray radiation in an ionization chamber, or by transferring charge images to the liquid layers.

On the other hand, it is not necessary to approach the charge images closely to the surface of the dielectric layer by means of a separate dielectric support. Employing one of the above-mentioned techniques, the charge images may also be produced directly on the rearside of the support of the liquid. In this context, charge images also comprise structured electrodes to which a potential is applied, i.e., to which charges are supplied. If such electrodes are grounded, an electrode having a potential different from zero has to be arranged above the liquid layer.

As mentioned above, those arrangements are preferred where the charge images are present under the liquid layer on the rearside of the support, since the distance between the charge and the surface of the liquid is small, about 100 μm. The distance can be further reduced by using thinner supports, e.g., polyester films of a thickness of about 35 μm, whereby the charging sensitivity of the system is increased.

If the charge image is produced between the liquid and its support, e.g., by means of electrode structures on the support, the support influence can be completely eliminated. With the aid of electrodes which can be contacted separately, it is possible to produce variable relief images. Among the electrodes which can be contacted separately, electrode matrixes of fine wires which are vertically arranged closely to one another in an insulating plate are of special interest. In arrangements where a dielectric liquid contacts the charge structure, poly-alpha-methyl styrene has proved especially suitable as the dielectric liquid.

Relief images can also be produced from charge patterns which are present above the surface of the liquid and separated from the latter by an air gap. It is difficult, however, to produce a charge pattern at a uniform, small distance above the liquid. In case of a very small distance of some 10 μm, the raised parts of the relief image may come into contact with the support carrying the charge pattern. For safe distance of, e.g., 500 μm, the relief formation may not be very distinct. The image can be reinforced, however, by homogeneously charging the liquid with a polarity opposed to that of the charge image.

The present invention further relates to an apparatus for rendering visible an electrostatic charge image by deforming the surface of a liquid into a reversible, optically readable relief image. This apparatus is characterized in that it comprises a casing having at least one partly optically transparent or open side, in which a support upon which a liquid film layer has been applied is assigned in a non-contacting manner to an electrostatic charge image on a second support; an optical device by means of which the relief image obtained is made visible on the surface of the liquid by incident light which is image-wise modified when passing through or being reflected by the relief image; and an arrangement for removing or erasing the charge image. The charge image can be produced in the casing itself, either by irradiation or electrostatographically or, alternatively, a charge image already produced can be introduced into the casing on a dielectric support, by means of a special device. It has proved advantageous to use one support only both for the liquid layer and for the electrostatic charge image.

BRIEF DESCRIPTION OF THE DRAWINGS

Exemplary, but not limiting, embodiments of the invention are set forth by way of the following examples taken in conjunction with the figures wherein.

EXAMPLE 1

Figure 1:
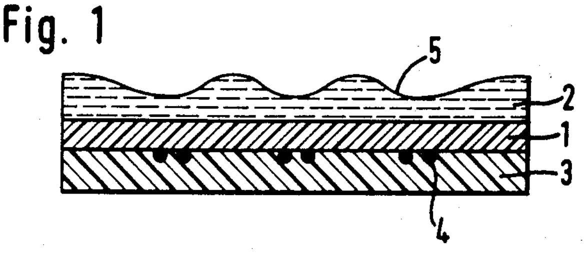
FIG. 1 shows one embodiment of the invention wherein the charge pattern is placed on a separate dielectric support below the liquid support dielectric.

As shown in FIG. 1, a polyethylene terephthalate film having a thickness of 70 μm and serving as the dielectric support 1, is coated with a layer 2 of a silicone oil having a resistivity of about $3 \cdot 10^{12}$ ohm·cm, a polarizability of about $13 \cdot 10^{-24}$ $cm^3$, a viscosity of about 4,000 mPa·s, and a thickness of about 40 μm. Another dielectric support 3, e.g., also a polyester film, carrying an electrostatic charge image 4, is laid onto the free side of the polyethylene terephthalate film 1. The electrostatic charge image 4 on the support 3 may have been created, for example, under a slit mask composed of a block provided with slits of a width of 1 mm, by utilizing a corona discharge of an arbitrarily chosen polarity.

A relief image 5 corresponding to the slit pattern is formed on the surface of the silicone layer 2. The relief image 5 remains stable, and only when the charge film 3 is removed, does the relief become plain again. Residual charges which may have been left on the rearside of the film 1 have to be removed by means of an earthed discharge comb or an a.c. corona. In this way, many relief images can be produced and erased without any signs of fatigue.

EXAMPLE 2

A glass plate, which has been provided with a conductive transparent stannic oxide layer, is coated with a photoconductive layer having a thickness of about 10 μm and being composed of equal parts by weight of poly-N-vinyl carbazole and trinitro fluorenone, and is further coated with an insulating cover layer of polystyrene having a thickness of about 7 μm. This layer pack is negatively charged under a corona, imagewise exposed (in this Example, a written text is chosen as the original), and negatively charged once more. Then a polyester film having a thickness of 50 μm and being provided with a liquid layer of a thickness of 20 μm, which is composed of poly-alpha-methyl styrene having a viscosity of about $1.4 \cdot 10^{16}$ ohm·cm, a polarizability of about $15 \cdot 10^{-24}$ cm$^3$, and a viscosity of about 36,000 mPa·s, is laid onto the polystyrene layer. The relief image obtained exactly corresponds to the text original, which is reinforced by applying a negative potential to the stannic oxide layer. After removing the polyester film, the relief image becomes reversibly plane again.

EXAMPLE 3

Figure 2:
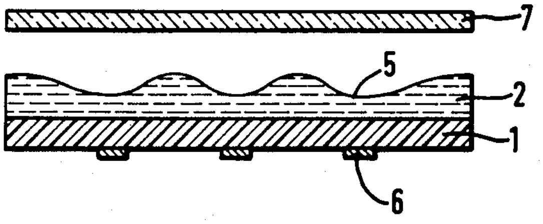
FIG. 2 illustrates another embodiment of the invention wherein a structured electrode is utilized on the underside of the liquid support and a planar electrode is arranged above the liquid surface.

One side of a dielectric support 1 according to FIG. 2, such as a polyester film of a thickness of 70 μm, is provided with a structured earthed electrode 6 which, e.g., may be of evaporated aluminum. The other side of the support 1 is coated with a silicon oil layer 2 having a thickness of about 30 μm. A planar electrode 7, e.g., of conductive glass, is arranged about 1 mm above the silicone layer. When a voltage (any polarity) of 1 kV is applied to the electrode 7, a relief image 5 corresponding to the structure of the electrode 6 is produced. As soon as the electrode 7 is grounded, the relief disappears. This process can be repeated without any signs of fatigue.

EXAMPLE 4

Figure 3:
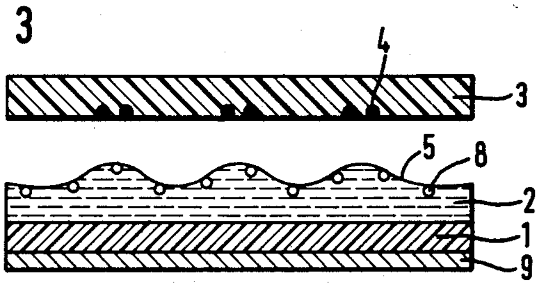
FIG. 3 is a further embodiment of the invention wherein a charge is introduced into the liquid and the charge image is positioned adjacent the upper surface of the liquid.

A polyethylene terephthalate film 1 (FIG. 3) having a thickness of 50 μm, to which an aluminum layer 9 has been applied by evaporating, is coated with a silicon oil layer 2 having a thickness of about 30 μm. Under a corona, the silicone oil layer 2 is homogeneously sprayed with charges 8 whose polarity is opposed to that of the charges to be displayed 4. A polyester film 3 carrying a charge image 4 and having a thickness of 90 μm, is arranged about 1 mm above the silicone oil layer 2. On the silicone oil layer 2 a relief image 5 forms. When the charge image support 3 with the charge image 4 is removed, the relief image 5 becomes reversibly plane again.

EXAMPLE 5

The upper side of a polyester film having a thickness of 50 μm is coated with a silicone oil layer having a thickness of 40 μm. Above the silicone oil layer, at a distance of about 1 mm, there is a transparent electrode to which a voltage of −1 kV is applied. Onto the underside of this polyester film, a dielectric support carrying a charge image having a positive polarity is laid. The dielectric support is composed of a polyester film of a thickness of 190 μm, carrying the strip-like charge images having a width of about 1 mm each, which have been produced by means of a corona discharge through a metal mask. Prior to each test, the individual surface charges under modified charging conditions are measured by means of a small-surface electrometer probe. The smallest surface charge which can be applied if a relief image shall be formed which is still visible to the naked eye, is $2 \cdot 10^{-10}$ As/cm$^2$. When there is no electrode above the dielectric liquid, $8 \cdot 10^{-10}$ As/cm$^2$ are required to obtain a visible relief formation.

EXAMPLE 6

A polyester film having a thickness of 50 μm is coated with a layer of fluid poly-alphamethyl styrene having a thickness of 20 μm. Another polyester film carrying a charge pattern is laid onto the free rearside of the coated polyester film. The charge pattern comprises groups of lines having different numbers of lines per mm. This high-resolution pattern has been obtained by means of electrode contact. The electrode is composed of conductively connected groups of lines of different widths, and consists of aluminum which has been vapor-deposited on a polyester film. The lines have been produced on the polyester film by coating it with copying lacquer, exposing, developing, vapor-depositing aluminum, and decoating. Up to the group comprising 8.98 lines/mm, strong relief images are obtained. The group having 10.1 lines/mm is still visible. When the charge image support is removed, the relief image becomes reversibly plane again.

The display of relief images on liquids by external charge patterns also permits a superposed display of charge patterns. Thus it is also possible, e.g., by the superposition of grid structures, to achieve an optically differentiated projection of homogeneous image areas of different charge densities, via appropriately screened relief images.

EXAMPLE 7

Figure 4:
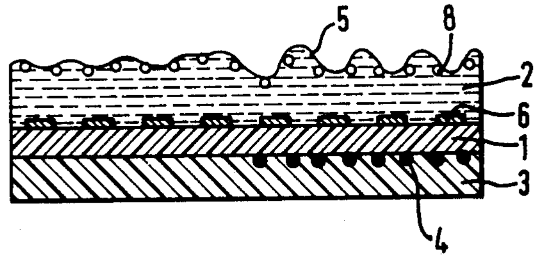
FIG. 4 is yet another embodiment of the invention wherein a grounded grid pattern is positioned on the upper side of the liquid support.

A polyester film 1 (FIG. 4) of a thickness of 50 μm whose upper side has been provided with a grounded grid structure of evaporated aluminum 6 having 10 lines/mm, is coated with a polyalpha-methyl styrene layer 2 having a thickness of 20 μm. When the underside of the polyester film 1 is brought into contact with a dielectric support 3 carrying a charge image 4 of negative polarity, a screened relief image 5 corresponding to the charge image 4 is obtained. By a hompogeneous positive charging 8 of the dielectric layer by a corona discharge, a strong relief structure outside the image area is produced. If the projection is made through an optical device, a negative image is obtained in undiffracted light of zeroth order, wherein the charge areas are shown bright. If the dielectric layer 2 is charged homogeneously before a contact is created with the charge image 4, the relief structures showing the strongest screen form in the area of the charge image. In the projected image, the charge image has a dark appearance.

EXAMPLE 8

The same process is employed as in Example 7, the only difference being that, instead of the poly-alpha-methyl styrene, a cumaron indene resin is used which has a resistivity of $5 \cdot 10^{13}$ ohm·cm, a polarizability of $18 \cdot 10^{-24}$ cm$^3$, and a viscosity of about 6,000 mPa·s. The quality of the relief image obtained is similar to that of Example 7.

EXAMPLE 9

The same process is employed as in Example 7, the only difference being that the liquid used is a chlorinated diphenyl resin. The resin has a resistivity of $2.5 \cdot 10^{15}$ ohm·cm, a polarizability of about $17 \cdot 10^{-24}$ $cm^3$, and a viscosity of about 42,000 mPa·s. The quality of the relief image obtained is similar to that of Example 7.

EXAMPLE 10

A polyester film having a thickness of 50 μm, which has been placed upon a glass plate in order to be mechanically supported is imagewise charged by a corona discharge under a metal master. The substrate thus charged is placed over a layer of water whose surface tension has been reduced by means of a surfactant, at a distance of about 500 μm. The charge pattern is directed downwardly. The water layer has a thickness of about 30 μm and is distributed on a polyester film which has been placed on a grounded metal plate. Within a few seconds, the water surface is deformed into a relief which corresponds to the master pattern. When the charge pattern is removed, the surface of the water becomes reversibly plane again within about 5 seconds.

EXAMPLE 11

Figure 5:
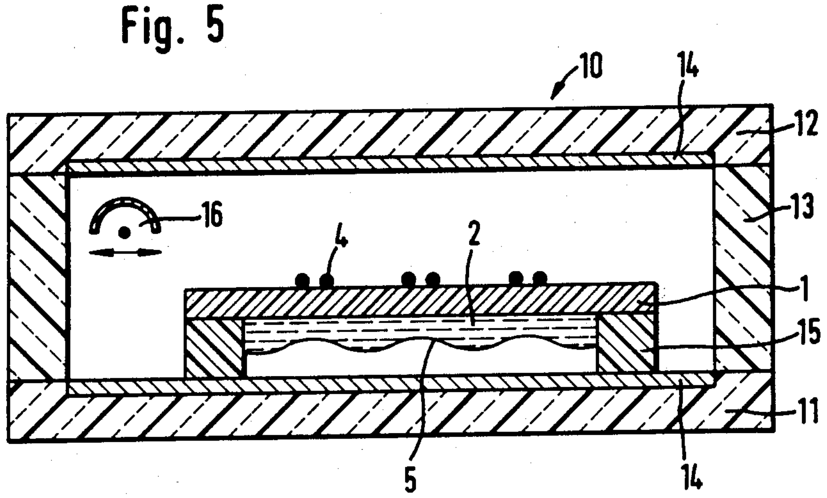
FIG. 5 illustrates apparatus in the form of an X-ray ionization chamber utilized in practicing the method of the invention.

The process for rendering visible charge images proposed by this invention, is very sensitive, as can be seen from the following example illustrated in FIG. 5.

For ionographic X-ray records in the medical practice, a dose of about 1 mR is required, by which charge images of $10^{-9}$ $As/cm^2$ are produced which are made visible by developing with toner. The technique according to this invention makes it possible, however, to display charge images of down to $10^{-10}$ $As/cm^2$ by the formation of relief images. Thus the technique according to the present invention can compete with the most sensitive X-ray display system, the X-ray pattern television amplifier. The resolution, i.e., the image quality, will probably be even better in cases where the relief image technique is employed. The X-ray pattern television amplifier resolves 2–3 lines/mm only, whereas in cases where the relief image technique using dielectric liquid layers according to the present invention is employed, up to 10 lines/mm are resolved.

The ionization chamber 10 containing a display layer of a dielectric liquid 2, is composed of the bottom 11, the cover 12 and the side walls 13. The chamber has a size of about 30 $cm^2$, and the cover 12 and the side walls 13 are made of plexiglass having a thickness of about 1 cm. The bottom 11 and the cover 12 are provided with conductive transparent layers 14. A polyester film 1 having a thickness of 50 μm is tightly stretched over a support 15 which is 2 mm high. The underside of the polyester film 1 is covered by a layer 2 of fluid poly-alpha-methyl styrene having a thickness of about 20 μm. The chamber itself is filled with xenon gas at a slight overpressure, and a voltage of 8 kV is applied to the electrodes 14 being arranged at a distance of 15 mm from one another. When X-rays are irradiated, a relief image is produced which is maintained even after termination of the irradiation and which can be projected through the transparent ionization chamber 10. When the electrode voltage is switched off, the charge image 4 is neutralized by means of a movable a.c. corona 16, whereupon the relief image 5 becomes reversibly plane again.

What is claimed is:

1. A process for rendering visible an electrostatic charge image by deforming the surface of a liquid having a resistivity of between $10^6$ and $10^{16}$ ohm·cm and a polarizability of between about $5 \cdot 10^{-24}$ and $20 \cdot 10^{-24}$ $cm^3$ and being present in a thickness of 10 to 100 μm on one of a metallic and dielectric support into a reversible, optically readable relief image, comprising the steps of positioning the electrostatic charge image producing the relief image—during the period in which the charge image is made visible—at a distance of about 10 to 1,000 μm from the surface of the liquid without contacting said liquid.

2. A process as claimed in claim 1, comprising the step of positioning the electrostatic charge image under the liquid layer on the rearside of the support of the liquid.

3. A process as recited in claim 1 wherein said support is formed from one of the group consisting essentially of rigid glass, flexible film and transparent polyester film.

4. A process for rendering visible an electrostatic charge image by deforming the surface of a liquid having a resistivity of between $10^6$ and $10^{16}$ ohm·cm and a polarizability of between about $5 \cdot 10^{-24}$ and $20 \cdot 10^{-24}$ $cm^3$ and being present in a thickness of 10 to 100 μm on one of a metallic and dielectric support into a reversible, optically readable relief image, comprising the steps of positioning the electrostatic charge image producing the relief image—during the period in which the charge image is made visible—at a distance of about 50 to 150 μm from the surface of the liquid without contacting said liquid.

5. A process as claimed in claim 1, 4, or 2, comprising the steps of producing an electrostatic charge image on a separate dielectric support and positioning said separate dielectric support at distances of about 10 to 1,000 μm from the surface of said liquid without contacting said liquid.

6. A process as claimed in claim 1, 4 or 2 wherein said liquid has a resistivity of between about $10^{10}$ and $10^{16}$ ohm-cm.

7. A process as claimed in claim 6, wherein said liquid comprises poly-alpha-methyl styrene having a viscosity between 10,000 and 50,000 mPa·s.

8. A process as claimed in claim 6, wherein said liquid comprises a silicone oil having a viscosity between about 1,000 and 10,000 mPa·s.

9. An apparatus for rendering visible an electrostatic charge image by deforming the surface of a liquid having a resistivity of between $10^6$ and $10^{16}$ ohm·cm and a polarizability of between about $5 \cdot 10^{-24}$ and $20 \cdot 10^{-24}$ $cm^3$, and being present in a thickness of 10–100 μm into a reversible, optically readable relief image, in accordance with the process claimed in claim 1, comprising:

- a casing having at least one partly optically transparent side,
- the metallic or dielectric support, being a first support, positioned in said casing and supporting said liquid,
- a second dielectric support having an electrostatic charge image therein, said second support positioned adjacent to and spaced from said liquid,
- optical means for rendering said relief image visible upon light passing through or reflected by said relief image, and
- means for erasing said relief image.

10. An apparatus as claimed in claim 9 wherein a single dielectric support is provided both for the liquid and for the electrostatic charge image.

11. An apparatus as claimed in claims 9 or 10, wherein the electrostatic charge image is made visible in an ionization chamber (10).

* * * * *